(12) United States Patent
McIlhany et al.

(10) Patent No.: US 6,978,194 B2
(45) Date of Patent: Dec. 20, 2005

(54) FIELD PANEL EVENT LOGGING IN A BUILDING CONTROL SYSTEM

(75) Inventors: Keith McIlhany, Antioch, IL (US); John Biedron, Park Ridge, IL (US); Robert Kalafut, Downers Grove, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 0 days.

(21) Appl. No.: 10/753,701

(22) Filed: Jan. 8, 2004

(65) Prior Publication Data

US 2004/0167672 A1    Aug. 26, 2004

Related U.S. Application Data

(60) Provisional application No. 60/444,238, filed on Jan. 31, 2003.

(51) Int. Cl.[7] .............................................. G05B 13/00
(52) U.S. Cl. ..................................................... 700/276
(58) Field of Search ........................... 700/9, 276, 277, 700/278, 282, 299, 300; 702/99, 105, 130; 165/200–303; 236/1, 44; 264/1 B, 3, 46 B, 46 C

(56) References Cited

U.S. PATENT DOCUMENTS

2003/0216839 A1 * 11/2003 Dudley ........................ 700/277

OTHER PUBLICATIONS

"Chapter 4 Filed Equipment Panel Harware", Aug. 18, 1998, CEMP-E, TI811-12.*

* cited by examiner

*Primary Examiner*—Leo Picard
*Assistant Examiner*—Chad Rapp

(57) ABSTRACT

A building control system, such as an HVAC system, has a field unit incorporating a control panel (a field panel) with a local user interface allowing user changes and/or modifications (events) to be made at the field panel to various objects or control points of the field panel, such as the point database, control programs, configurations and other data. A log of the changes made at the control panel is maintained, compiled and/or stored locally (i.e. at the field control panel level). The local log maintains the changes as events. The local log identifies data regarding the change itself, who made the change and when the change was made (identification data). The local log can be viewed locally or uploaded to a workstation where it can be stored, viewed and combined with a system wide log.

20 Claims, 4 Drawing Sheets

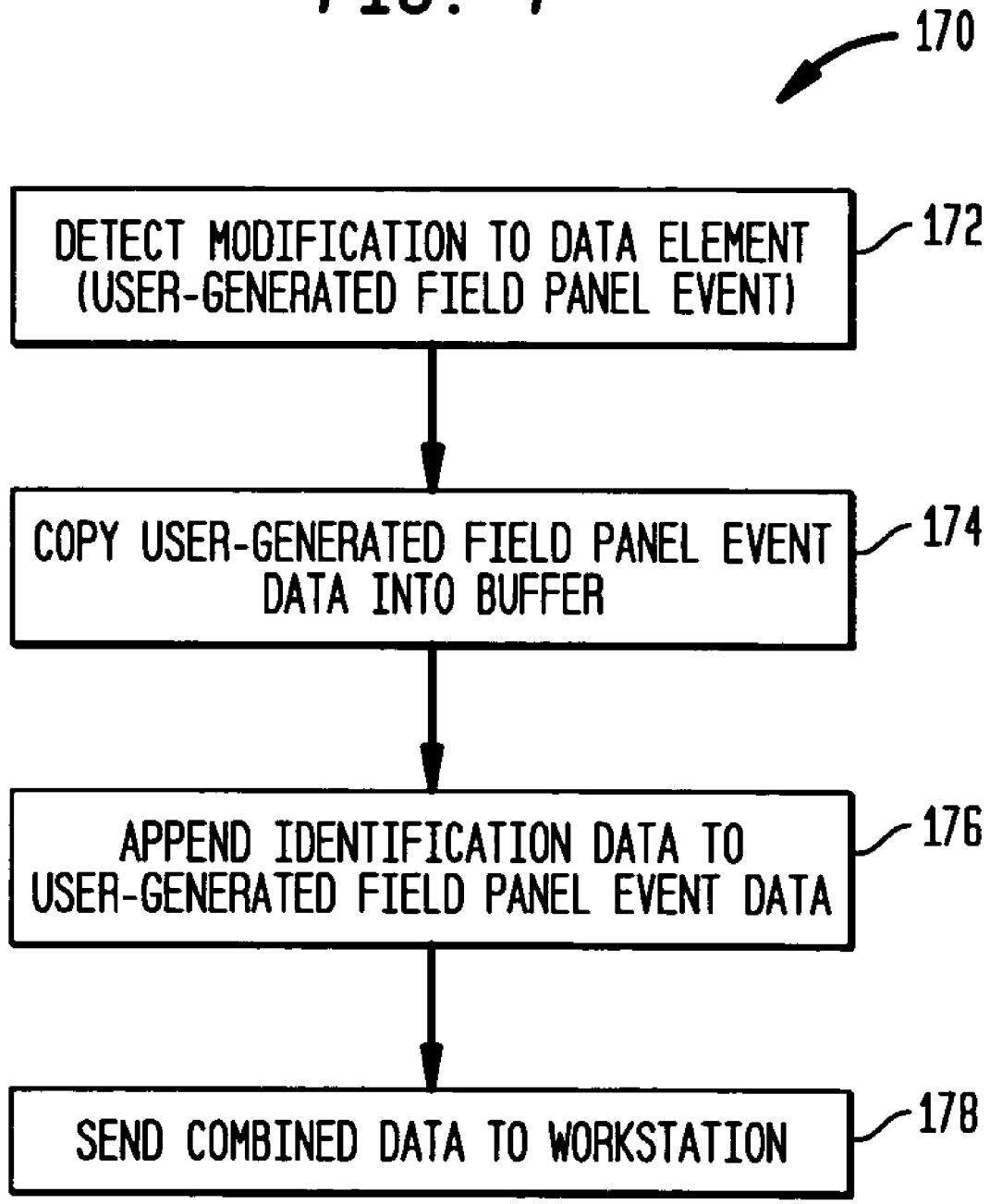

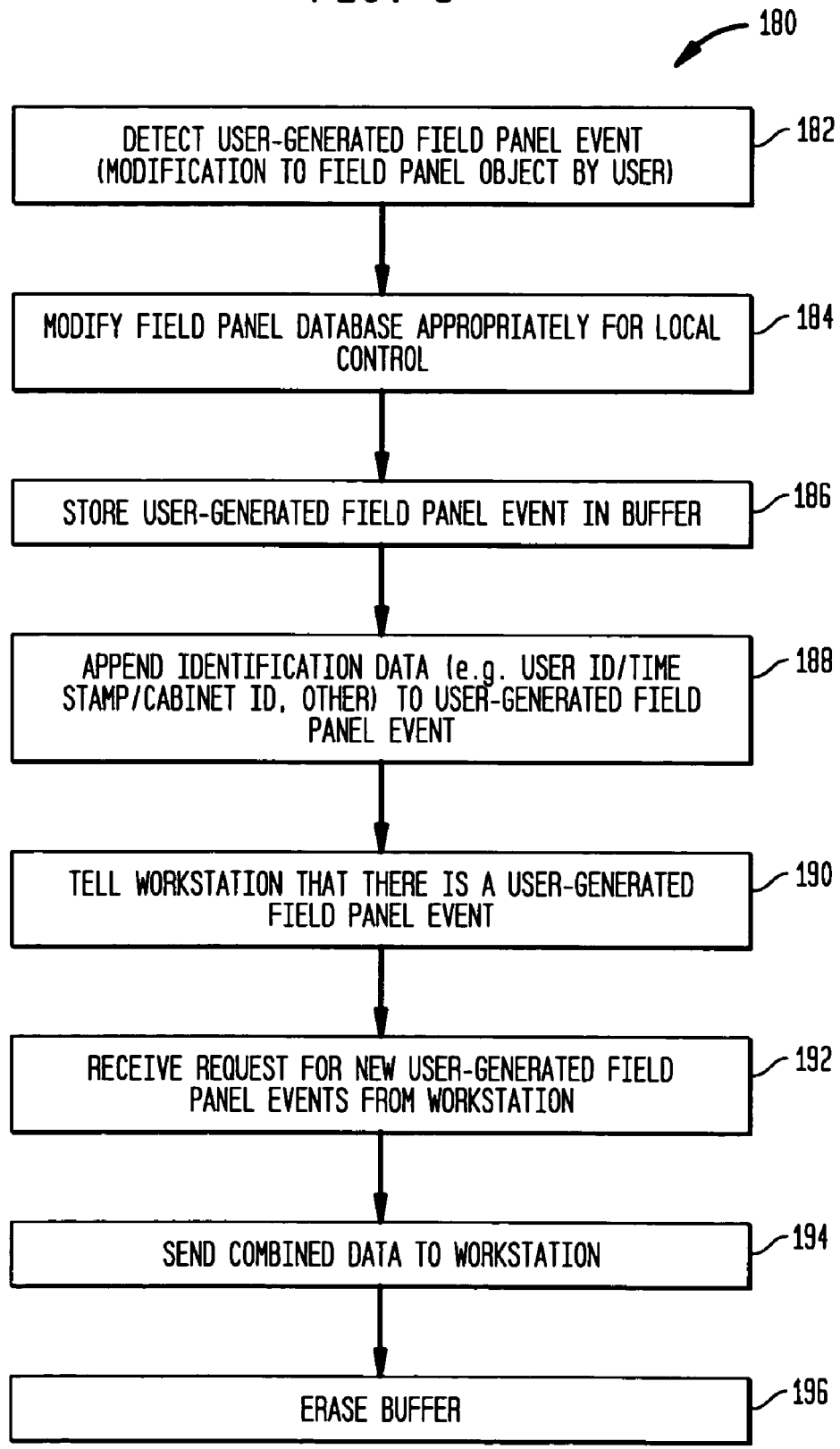

FIELD PANEL EVENT LOGGING IN A BUILDING CONTROL SYSTEM

This application is based on U.S. Provisional Patent Application No. 60/444,238, filed on Jan. 31, 2003, and claims the benefit thereof for priority purposes.

FIELD OF THE INVENTION

The present invention relates generally to building systems and, more particularly, to system event logging in a building control system.

BACKGROUND OF THE INVENTION

Building control systems encompass a wide variety of systems that aid in the monitoring and control of various aspects of building operation. Building control systems include security systems, fire safety systems, lighting systems, and heating, ventilation, and air conditioning ("HVAC") systems. In large commercial and industrial facilities, such systems have an extensive number of elements and are highly automated.

The elements of a building control system are widely dispersed throughout a facility. For example, an HVAC system includes temperature sensors and ventilation damper controls as well as other elements that are located in virtually every area of a facility. Similarly, a security system may have intrusion detection, motion sensors and alarm actuators dispersed throughout an entire building or campus. Likewise, fire safety systems include smoke alarms and pull stations dispersed throughout the facility. To achieve efficient and effective building control system operation, there is a need to monitor the operation of, and often communicate with, the various dispersed elements of a building control system.

To this end, building control systems typically have one or more centralized control stations in which data from the system may be monitored, and in which various aspects of system operation may be controlled and/or monitored. The control station typically includes a computer having processing equipment, data storage equipment, and a user interface. To allow for monitoring and control of the dispersed control system elements, building control systems often employ multi-level communication networks to communicate operational and/or alarm information between operating elements, such as sensors and actuators, and the centralized control station.

One example of a building control system control station is the Apogee Insight® Workstation, available from Siemens Building Technologies, Inc. of Buffalo Grove, Ill., which may be used with the model Apogee® building control system, also available from Siemens Building Technologies, Inc. In this system, several control stations, connected via an Ethernet or another type of network, may be distributed throughout one or more building locations, each having the ability to monitor and control system operation. As a consequence, different people in different locations of the facility may monitor and control building operations.

The typical building control system (including those utilizing the Apogee Insight® Workstation) has a plurality of field panels that are in communication with a workstation. In addition, the building control system also includes one or more field devices connected to the field panels. Each field device is typically operative to measure and/or monitor various building control system parameters.

While the workstation is generally used to make modifications and/or changes to one or more of the various components of the building control system, a field panel may also be operative to allow certain modifications and/or changes to one or more parameters of the system. This typically includes parameters such as temperature and otherwise, set port changes, modify a control program or the like.

In industries that manufacture chemical, semiconductor and pharmaceutical products, for instance, there is a need for controlling the environment in the processing rooms and/or areas. Various manufacturing processes in these industries require strict control of environmental factors. As a consequence, it is often desirable to track changes within the building control system. Additionally, various federal regulations that pertain to these types of manufacturing require monitoring and/or reporting or recording of various parameters associated with the building control system for manufacturing validation. This is accomplished via a building control system log.

Currently, changes made by a user to the building control system at a system workstation level (i.e. a workstation) are logged by the workstation into a workstation event log. Changes made at the field panel level (i.e. a field unit) are not automatically logged or captured. Typically, if changes made at the field panel that effect the environment in a particular area are to be logged, this must be done using a handwritten log book. The handwritten log entries may then be entered manually into the workstation via user interface equipment at the work station. The inclusion of so many manual reporting translation steps can lead to errors, and is in any event inefficient.

It would thus be advantageous to have a field panel that allows automatic capture of changes and/or modifications made on a field panel of a building control system. It would be further advantageous to have a building control system that can accomplish event logging at the field unit level.

There is a need, therefore, for a building control system that allows logging of user-generated field panel changes and/or modifications.

SUMMARY OF THE INVENTION

The subject invention provides field panel event logging in a building control system. User generated events performed on a field panel of a building control system are logged by the field panel. Logged events are stored by the field panel and transmitted to a server of the building control system as appropriate. The server may then add the logged events to a system event log.

In one form, the subject invention is a method of operating a building control system. The method includes the steps of: (a) receiving a user generated event at a field panel of the building control system; (b) storing data regarding the received user generated event at the field panel; and (c) transmitting the stored data regarding the received user event at the field panel to the workstation. The workstation may then maintain a master log that includes all changes, even those that occur at the field panel level.

In another form, the subject invention is a building control system. The building control system includes a workstation and a field panel in communication with the workstation, wherein the field panel is operative to receive a user generated field panel event, store data regarding the user generated field panel event, append identification data to the stored data regarding the user generated field panel event, and forward the data regarding the user generated field panel event and appended identification data to the workstation.

In another form, the subject invention provides a method of operating a building control system, the building control system having a workstation and at least one field panel. The method including the steps of: (a) detecting a user generated modification to a field panel data element by a field panel of the building control system; (b) storing data regarding the detected user generated modification to the field panel data element; (c) appending field panel modification data to the data regarding the detected user generated modification to the field panel data element to define stored appended field modification data; and (d) transmitting, by the field panel, the stored appended field modification data to the workstation.

In all forms, the subject invention eliminates the need for manual entry of user-generated field panel events into a record or log. Therefore, no notebooks or the like need to be kept. Moreover, the subject invention provides an audit trail for validating certain products such as pharmaceuticals, especially under federal regulations such as 21 CFR §11.

The above-described features and advantages, as well as others, will become more readily apparent to those of ordinary skill in the art by reference to the following detailed description and accompanying drawings.

BRIEF DESCRIPTION OF THE DRAWINGS

FIG. 4 is a flow diagram of an exemplary manner of doing something related to the subject invention; and FIG. 5 is a flow diagram of another exemplary manner of doing something related to the subject invention.

DETAILED DESCRIPTION

Figure 1:
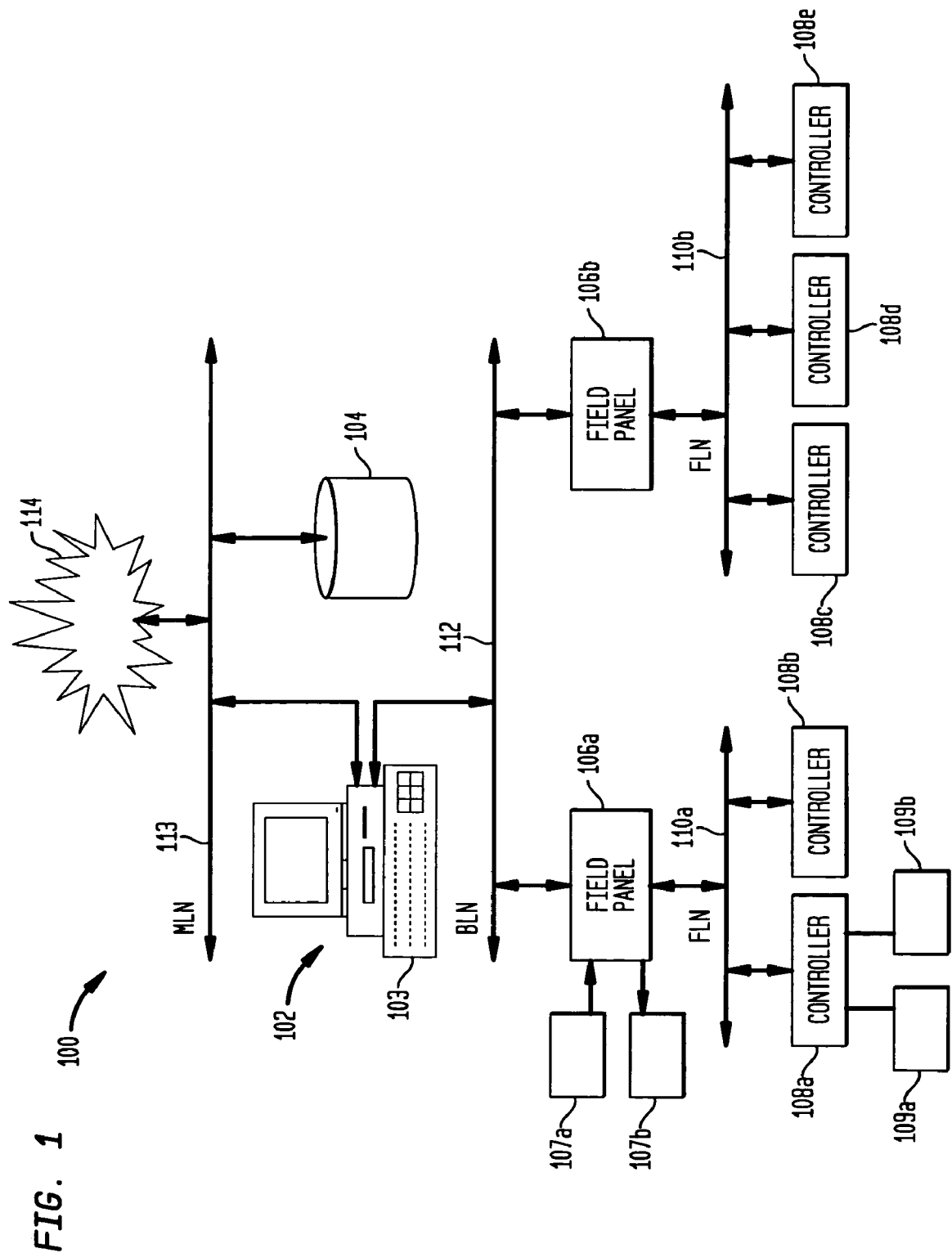
FIG. 1 shows a block diagram of an exemplary building control system in which the principles of the subject invention are utilized.

FIG. 1 depicts a system block diagram of an exemplary building control system (BCS) 100 in which the subject invention may be used. The building control system 100 is depicted as a distributed building system that provides control functions for any one of a plurality of building operations. Building control systems may thus include HVAC systems, security systems, life or fire safety systems, industrial control systems and/or the like. An example of a BCS is the APOGEE® system available from Siemens Building Technologies, Inc. of Buffalo Grove, Ill. The APOGEE® system allows the setting and/or changing of various controls of the system, generally as provided below. It should be appreciated that the building control system 100 is only an exemplary form or configuration for a building control system. Therefore, the principles of the subject invention are applicable to other configurations and/or forms of building control systems.

The building control system 100 includes at least one supervisory control system or workstation 102, a system database 104, a plurality of field panels represented by field panels 106a and 106b, and a plurality of controllers represented by controllers 108a–108e. It will be appreciated, however, that wide varieties of BCS architectures may be employed.

Each of the controllers 108a–108e corresponds to one of plurality of localized, standard building control subsystems, such as space temperature control subsystems, lighting control subsystems, or the like. Suitable controllers for building control subsystems include, for example, the model TEC (Terminal Equipment Controller) available from Siemens Building Technologies, Inc., of Buffalo Grove, Ill. To carry out control of its associated subsystem, each controller 108a–108e connects to one or more sensors and/or actuators, shown by way of example as the sensor 109a and the actuator 109b connected to the controller 108a.

Typically, a controller such as the controller 108a effects control of a subsystem based on sensed conditions and desired set point conditions. The controller controls the operation of one or more actuators to attempt to bring the sensed condition to the desired set point condition. By way of example, consider a temperature control subsystem that is controlled by the controller 108a, where the actuator 109b is connected to an air conditioning damper and the sensor 109a is a room temperature sensor. If the sensed temperature as provided by the sensor 109a is not equal to a desired temperature set point, then the controller 108a may further open or close the air conditioning damper via actuator 109b to attempt to bring the temperature closer to the desired set point. Such systems are known. It is noted that in the BCS 100, sensor, actuator and set point information may be shared between controllers 108a–108e, the field panels 106a–106b, the work station 102 and any other elements on or connected to the BCS 100.

To facilitate the sharing of such information, groups of subsystems such as those connected to controllers 108a and 108b are typically organized into floor level networks ("FLNs") and generally interface to the field panel 106a. The FLN data network 110a is a low-level data network that may suitably employ any suitable proprietary or open protocol. Controllers 108c, 108d and 108e along with the field panel 106b are similarly connected via another low-level FLN data network 110b. Again, it should be appreciated that wide varieties of FLN architectures may be employed.

The field panels 106a and 106b are also connected via a building level network ("BLN") 112 to the workstation 102 and the database 104. The field panels 106a and 106b thereby coordinate the communication of data and control signals between the controllers 108a–108e and the supervisory computer 102 and database 104. In addition, one or more of the field panels 106a, 106b may themselves contain control programs for controlling HVAC actuators such as those associated with air handlers or the like. To this end, as shown in FIG. 1, the field panel 106a is operably connected to one or more HVAC system devices, shown for example as a sensor 107a and an actuator 107b.

The workstation 102 provides overall control and monitoring of the building control system 100 and includes a user interface. The workstation 102 further operates as a BCS data server that exchanges data with various elements of the BCS 100. The BCS data server can also exchange data with the database 104. The BCS data server 102 allows access to the BCS system data by various applications. Such applications may be executed on the workstation 102 or other supervisory computers, not shown, connected via a management level network ("MLN") 113.

The workstation 102, which is a user access point for the system components (including the field panels 106a and 106b), is operative to accept modifications, changes, alterations and/or the like ("workstation events") from the user. This is typically accomplished via a user interface for or of the computer 102. The user interface may be the keyboard 103 of the workstation 102. The workstation 102 is operable to, among other things, affect or change operational data of the field panels 106a, 106 as well as other components of the BCS 100. The field panels 106a and 106b utilize the data and/or instructions from the workstation 102 to provide control of connected devices such as devices 107a and 107b and/or the controllers 108a and 108b.

The workstation 102 is also operative to poll or query the field panels 106a and 106b for gathering data. The workstation 102 processes the data received from the field panels 106a and 106b, including maintaining a log of field panel events and/or logging thereof. Information and/or data is thus gathered from the field panels 106a and 106b in connection with the polling, query or otherwise, which the workstation 102 stores, logs and/or processes for various uses. To this end, the field panels 106a and 106b are operative to accept modifications, changes, alterations and/or the like ("field panel events") from the user.

The workstation 102 also preferably maintains a database associated with each field panel 106a and 106b. The database maintains operational and configuration data for the associated field panel.

The supervisory computer or workstation 102 is operatively connected to a web server 114 and other supervisory computers, not shown, via the MLN 113 that may suitably be an Ethernet network. The supervisory computer 102 uses the MLN 113 to communicate BCS data to and from other elements on the MLN 113, including the web server 114. The database 104 stores historical data, error data, system configuration data, graphical data and other BCS system information as appropriate.

The MLN 113 may connect to other supervisory computers, not shown, Internet gateways including, by way of example, the web server 114, or other gateways to other external devices, not shown, as well as to additional network managers (which in turn connect to more controllers/subsystems via additional low level data networks). The MLN 112 may suitably comprise an Ethernet or similar wired network and may employ TCP/IP, BACnet, and/or other protocols that support high speed data communications.

The field panels 106a and 106b are operative to accept modifications, changes, alterations and/or the like ("field panel events") from the user with respect to objects defined by the BCS 100. The objects are various parameters, control and/or set points, port modifications, terminal definitions, users, date/time data, alarms and/or alarm definitions, modes, and/or programming of the field panel itself, another field panel, and/or any controller in communication with a field panel. It should here be appreciated that for the below discussion when appropriately referring to FIG. 1, the functionality, features, attributes, characteristics, operation and/or the like of each field panel is the same for every field panel except where indicated, and will be described as such with reference to only field panel 106a. Therefore, the below discussion with reference to field panel 106a is equally applicable to all field panels unless indicated otherwise.

The field panel 106a is further operative to maintain a log of user-generated field panel events. Preferably, the system does not allow an operator to select which of the field panel events are to be logged. By not allowing user selection as to the events to be logged the integrity of the log may be ascertained.

The field panel maintains the log locally at least on a temporary basis. The log includes data regarding each change instituted by the user, in other words, the field panel event itself. Additionally, the field panel generates identification information that is associated with the user-generated field panel event data. This generated information may be maintained in the field panel log, or may be stored elsewhere.

The field panel 106a is further operative to provide the user-generated field panel data regarding the logged field panel events to the workstation 102. The workstation 102 utilizes the field panel events data to generate a master log of such events. In this manner, user-generated events at the field panel (field panel level) are automatically captured by or logged into the workstation. The field panel 106a may or may not discard the log data once it has been transferred to the workstation 102. It will be appreciated that the master log may be maintained in another device, such as another field panel. The master log may include field panel events data from other field panels, as well as data from events implemented at the workstation 102 itself.

Each field panel event is logged, including by way of non-limiting example, user account modifications, point commands, time changes, and/or the like. A field panel event record is preferably created for each event. In addition to the changed parameters, user and panel time and date are preferably added to or associated with each event record. Fields for "supervisor" and "reason for the modification" may also be included.

In the exemplary embodiment described herein, the event record is not immediately provided to the workstation, but instead is buffered in memory of the panel 106a. The field panel 106a then transmits a database or record change indication to the workstation 102. The workstation 102 responds to the record change indication with an event object upload request. The field panel 106a responds to the event object upload request by sending the buffered event records to the workstation 102, starting with the oldest record first. The workstation 102, upon receipt of the record (s), will correlate the log/upload according to the time stamp, log the data to permanent storage and update the panel database maintained by the workstation 102.

Alternatively, the workstation 102 may query for field panel event data on a periodic basis. In such a case, the field panel 106a would not necessarily transmit the record change indication. Moreover, it is possible for the field panel 106a to transmit panel event data without a request from the workstation 102, but such operation could disrupt smooth communication network operations.

In any event, the field panel 106a includes enough memory to store a given number of events. Should the memory be full while another event is attempting to be buffered, the system will indicated an out of memory situation and lock out any further changes until the buffer has adequate space. The field panel 106a buffers all data that is then reported to the workstation 102. The workstation 102 is responsible for data separation and/or elimination.

Figure 2:
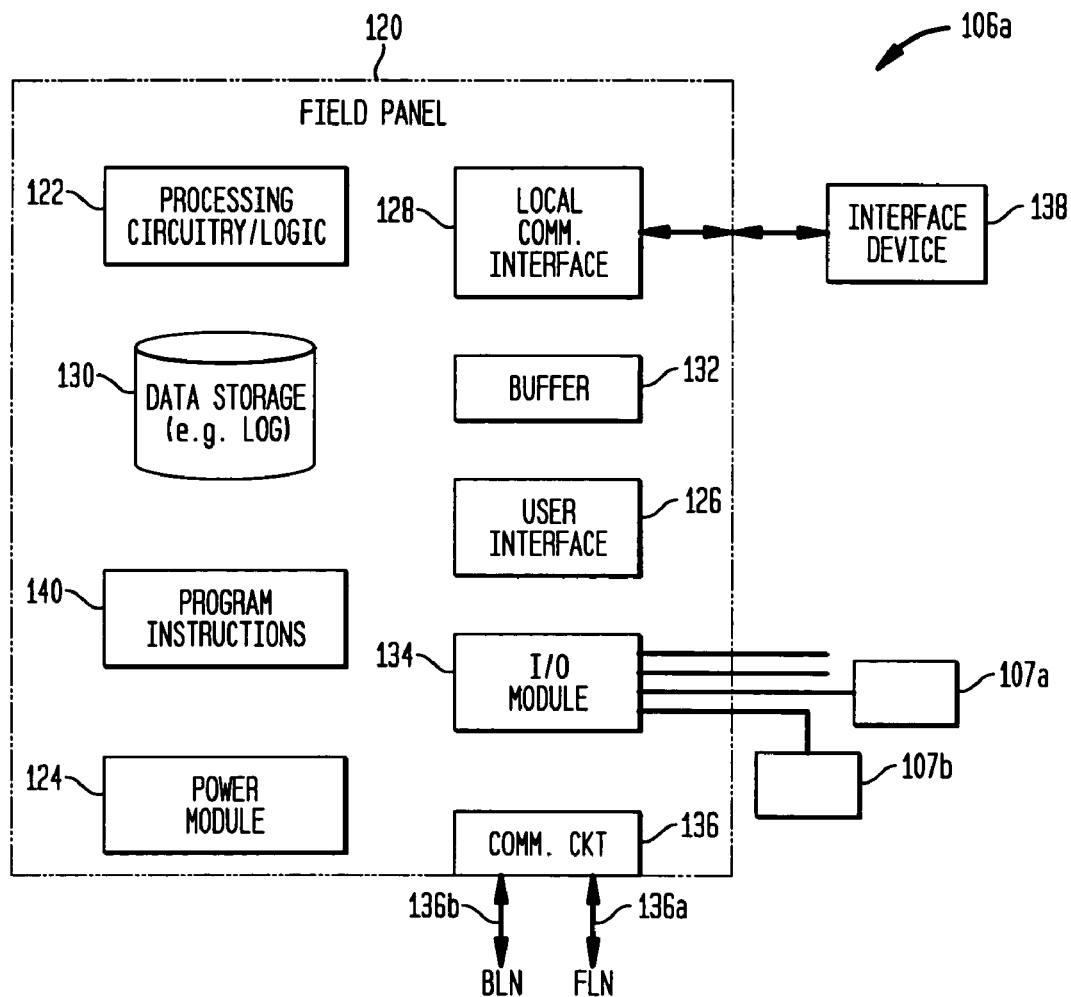
FIG. 2 is a block diagram of an exemplary field panel/control unit incorporating the principles of the subject invention.

FIG. 2 presents a block diagram of an exemplary embodiment of the field panel 106a. It should be appreciated that the embodiment of the field panel 106a is only an exemplary embodiment of a field panel in which the subject invention may be utilized. As such, the exemplary embodiment of the field panel 106a of FIG. 2 represents all manners or configurations of field panels that are operative in the manner set forth herein.

The field panel 106a includes a housing, cabinet or the like 120 that is configured in a typical manner for a building control system field panel. The field panel 106a includes processing circuitry/logic 122 that is operative, configured and/or adapted to operate the field panel 106a including the features, functionality, characteristics and/or the like as described herein. To this end, the processing circuit 122 is operably connected to all of the elements of the field panel 106a described below. The processing circuitry/logic 122 is typically under the control of program instructions or programming 140 (software or firmware). The program instructions 140 are modifiable as a user-generated field panel event.

The field panel 106a also includes a power module 124 that is operative, adapted and/or configured to supply appropriate electricity to the field panel 106a (i.e. the various components of the field panel). The power module 124 preferably operates on standard 120 volt AC electricity, but may operate on 24 volt AC electricity or include DC power supplied by a battery or batteries.

An input/output (I/O) module 134 is also provided in the field panel 106a. The I/O module 134 includes one or more input/output circuits that communicate directly with terminal control system devices such as actuators and sensors. Thus, for example, the I/O module 134 includes analog input circuitry for receiving analog sensor signals from the sensor 107a, and includes analog output circuitry for providing analog actuator signals to the actuator 107b. The I/O module 134 typically includes several of such input and output circuits.

The field panel 106a further includes a digital communication port circuit 136. The digital communication port circuit 136 allows for communication to the controllers 108a and 108b as well as other components on the FLN 110a, and furthermore allow for communication with the workstation 102, other field panels (e.g. field panel 106b) and other components on the BLN 112. To this end, the digital communication port circuit 136 includes a first port 136a, which may suitably be a RS-485 standard port circuit, that is connected to the FLN 110a, and a second port 136b, which may also be an RS-485 standard port circuit, is connected to the BLN 112.

The field panel 106a may also be accessed locally, and it is through this control that user-generated field panel change events may occur. To facilitate local access, the field panel 106a includes a local communication interface 128 and an interactive user interface 126. The local communication interface 128 provides a connection to a local interface device 138. Through this connection, the interface device 138 may generate a field panel event, i.e. by changing operational data/parameters stored within the field panel 106a. The interface device 138 may also obtain data from the field panel 106a such as user-generated field panel events and/or data regarding user-generated field panel events, for example, identification data regarding the user-generated field panel event. The interface device 138 may be temporarily connected to the field panel 106a for the purpose of sending data to the field panel and/or acting as a user-interface for the field panel 106a. The interface device 138 may be a computer such as a portable notebook computer.

The user interface 126 of the field panel 106a includes devices the display data and receive input data that are permanently affixed to the 120, as opposed to being portable and moveable. The user interface 126 may suitably include an LCD type screen or the like, and a keypad. The user interface 126, if provided, is operative, configured and/or adapted to both alter and show information regarding the field panel 106a, such as status information, and/or other data pertaining to the operation, function and/or modifications or changes to the field panel 106a.

As discussed generally above, modifications and/or changes to the field panel 106a made by a user (i.e. user-generated field panel events) are accomplished, in one form, through the local communication interface 128 or the user interface 126. Such user-generated field panel events may be made to any field panel parameter, characteristic, programming, and/or the like. Changes may also be made to field panel parameters, characteristics, programming and the like to another field panel through the local communication interface 128 or the user interface 126. Such changes may then be communicated to such other field panels via the BLN 112. Similarly, user-generated changes to the field panel 106a may be received from the BLN 112.

The field panel 106a also includes a buffer 132. The buffer 132 is operative, configured and/or adapted to temporarily store data or information for the field panel 106a. The buffer 132 may be a random access memory (RAM) buffer or other type of device that temporarily stores data/information and allows the retrieval of the stored data. In particular, the buffer 132 temporarily stores data regarding user-generated field panel events as well as any appended data such as identification data with regard to the user-generated field panel event. The buffer 132 preferably does not operate as a circular buffer. That is, the buffer 132 is configured, adapted and/or operative to block additional data from being temporarily stored by the buffer when the buffer 132 is full. To this end, the field panel will block the user from making additional changes. When there is room for the additional data in the buffer 132, the field panel 106a will accept the changes. In this manner, event records that are temporarily stored in the buffer 132 will not be lost. Event record data is retrieved from the buffer 132 by the workstation 102 when the workstation is maintaining the workstation log or master log.

The field panel 106a also includes a data storage device 130 that is operative, configured and/or adapted to store data, particularly a local or field panel log with regard to user-generated field panel events and/or data thereof, and also identification data pertaining to the user-generated field panel event. Such identification data includes, but is not limited to, user ID, time stamp, field panel (cabinet) ID, and/or the like that provides identification as to how, when and where the user-generated field panel event was accomplished. Thus, the field panel 106a is operative, configured and/or adapted to obtain and/or create this data when a user-generated field panel event is made.

In the embodiment described herein, the data storage device 130 maintains a log of user-generated changes that enter the BCS 100 via the field panel 106a. Thus, if a change is received via the user interface 126 or the local communication interface 128, then the change is logged at the field panel 106a. Even changes to other field panels are logged as long as they are received into the system 100 (via interface 126 or 128) at the field panel 106a. However, if a change to data at the field panel 106a is received via the BLN 112, then the field panel 106a does not log the change, because it will have been logged by another entity (either the workstation 102 or another field panel).

Figure 3:
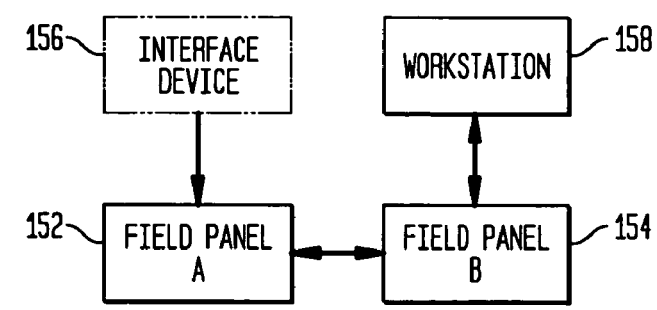
FIG. 3 is a block diagram illustrating a manner of making changes and/or modifications to a field panel and/or the ability to obtain data regarding user-generated modification and/or changes to a field panel or a log thereof.

Referring now to FIG. 3, there is depicted a block diagram, generally designated 150, illustrating a principle of the subject invention. While the workstation 102 typically obtains the identification data and/or the data regarding the user-generated field panel event particularly for the workstation log, such information may be gathered in another manner. This is because the field panel 106a is adapted, configured and/or operative to record and/or store the user-generated field panel event (and/or data regarding the user-generated field panel event).

Particularly, in FIG. 3 an interface device 156, being the same or different from the interface device 138, is plugged into the field panel A (152) via a port of the field panel A. The identification data and/or the data regarding the user-generated field panel event may then be obtained by the interface device 156 rather than sending the information to the workstation 158. Additionally, because the other field panels (such as field panel B, 154) are connected to the field panel A, identification data and/or the data regarding the user-generated field panel event may be obtained from the field panel B by the interface device 156 through the field panel A.

Moreover, the interface device 156 may be used to enact modifications and/or changes to objects of the field panel (i.e. user-generated field panel events) in like manner to the interface device 138. Particularly, the interface device 156 may be used to perform field panel events on field panel A or field panel B. Regardless, however, of where the interface device is connected to the system, the field panel that has been modified and/or changed maintains the data regarding the identification data and/or the user-generated field panel event. The workstation 158 is operative, configured and/or adapted to poll or question the field panels, particularly, but not necessarily, after the workstation has received a notification from a field panel that a user-generated field panel event has occurred.

Referring now to FIG. 4, there is depicted a flowchart, generally designated 170, of an exemplary manner of operation of the subject invention. This flowchart 170 is described with reference to the exemplary field panel 106a of FIG. 2. It should be appreciated that the manner of operation depicted in the flowchart 170 of FIG. 4 is only exemplary of one manner in which the subject invention functions. Other manners, as well as additional steps, less steps, or modified steps constitute valid functioning of the subject invention in accordance with the present principles.

The flowchart 170 begins with step 172. In step 172, the processing circuitry 122 of the field panel 106a accepts modification and/or change to a data element of the field panel. The data element may be a BCS object maintained with or communicated by the field panel, a programming change or other user-generated field panel event that affects, changes and/or modifies a characteristic, variable, object or operation of the field panel. In step 174, the processing circuitry 122 copies data regarding a user-generated field panel event into the field panel buffer 132. In step 176, the processing circuitry 122 appends identification data to the user-generated field panel event data in the buffer 132. The identification data provides particulars regarding the time/date of the user-generated field panel event, the technician made the user-generated field panel event, a field panel/cabinet identification, and other identification information. In step 178, the processing circuitry 122 causes the I/O module 134 to communicate the combined data (i.e. the data regarding the user-generated field panel event and the appended identification data) to the workstation (e.g. workstation 102 of FIG. 1). The workstation utilizes the information to record or maintain a log the user-generated field panel events.

Referring now to FIG. 5, there is depicted another flowchart, generally designated 180, of an exemplary manner of operation of the subject invention. It should be appreciated that the manner of operation depicted in the flowchart 180 of FIG. 5 is only exemplary of one manner in which the subject invention functions. Other manners, as well as additional steps, less steps, or modified steps constitute valid functioning of the subject invention in accordance with the present principles.

The flowchart 180 begins with step 182. In step 182, the processing circuitry 122 accepts a user-generated field panel event (modification to a field panel object by a user). Thereafter, in step 184 the processing circuitry 122 modifies the field panel database in data storage 130 (i.e. according to the user-generated event) to reflect the modification to field panel object. The modified object may alter the operation of control algorithms in the field panel 106a itself or to the operation of control algorithms in attached field devices.

In step 186, the user-generated field panel event is stored in the field panel buffer 132, particularly as user-generated field panel event data. The processing circuitry 122 preferably appends identification data (e.g. user ID, time stamp, field panel/cabinet ID, and otherwise) to the user-generated field panel event data stated in the buffer 132.

In step 190, the processing circuitry 122 causes the I/O module 134 to send a notification message to the entity maintaining the master log, for example, the workstation 102 of FIG. 1. The notification message notifies the log maintaining entity that a user-generated field panel event has occurred. In the meantime, the field panel 106a maintains the data in the buffer 132. The field panel buffer 132 may store as many user-generated field panel events (event data) and appended data (identification data) as is room for the data in the buffer, until the data is purged.

Some time after receiving the notification message (or several notification messages) the remote entity maintaining the log (e.g. workstation 102), communicates an upload object request for field panel event records to the field panel 106a. As a result, in step 192, the field panel 106a receives a request for new user-generated field panel events. In step 194, the processing circuitry 122, sends the combined data in the buffer to the log maintaining entity. Thereafter, in step 196, the buffer is erased.

Referring again generally to FIG. 2, it is noted that the interface device 138 may obtain log information from the data storage 130 of the field panel 106a. The interface device 138 may be connected to, or include, a printer that allows the user to print out the log for the field panel 106a. In general, the system 100 may be configured such that individual logs of each field panel 106a, 106b, etc. are collected manually as a verification of the master log maintained at the workstation 102. Alternatively, the system 100 may rely primarily on manual collection of field panel event logs, although such a solution is less automated than the embodiment described above.

It will be appreciated that the above-described embodiments are merely exemplary, and that those of ordinary skill in the art may readily devise their own implementations and modifications that incorporate the principles of the present invention and fall within the spirit and scope thereof.

We claim:

1. A method of operating a building control system, the method comprising the steps of:
    receiving a user generated event at a field panel of the building control system;
    storing data regarding the received user generated event at the field panel; and
    transmitting the stored data regarding the received user event at the field panel to a workstation.

2. The method of claim 1, further comprising, prior to transmitting the stored data:

forwarding, by the field panel, notification of the received user generated event to a workstation of the building control system; and receiving, by the field panel, a request from the workstation for data regarding the received user generated event.

3. The method of claim 1, wherein the step of storing data regarding the user generated events at the field panel includes temporarily storing data regarding the user generated events at the field panel.

4. The method of claim 3, wherein the user generated events are temporarily stored in a buffer.

5. The method of claim 1, wherein the step of accepting a user generated event at a field panel of the building control system includes accepting a user generated event at a field panel via a user interface of the field panel.

6. The method of claim 1, further comprising the step of:
appending identification data to the stored data regarding the received user event at the field panel.

7. The method of claim 6, wherein the identification data includes user identification, time identification and field panel identification.

8. The method of claim 1, further comprising the step of:
modifying a field panel database of the field panel with regard to the received user generated event.

9. The method of claim 1, further comprising a step of executing at the field panel a control operation for a building control system actuator.

10. In a building control system having a workstation and at least one field panel, a method of operating the building control system comprising the steps of:
detecting a user generated modification to a field panel data element by a field panel of the building control system;
storing data regarding the detected user generated modification to the field panel data element;
appending field panel modification data to the data regarding the detected user generated modification to the field panel data element to define stored appended field modification data;
transmitting, by the field panel, notification of receipt of a user generated modification to the workstation;
transmitting, by the field panel, the stored appended field modification data to the workstation.

11. The method of claim 10, further comprising the step of:
modifying a field panel database with the data regarding a user generated modification to a field element of the field panel.

12. The method of claim 10, further comprising the step of storing data regarding the detected user generated modification to the field panel data element includes temporarily storing data regarding the user generated modification at the field panel.

13. The method of claim 12, wherein the data regarding the user generated modification is temporarily stored in a buffer.

14. A building control system comprising:
a workstation; and
a field panel in communication with the workstation, the field panel including an I/O device connected to communicate with at least one of a group consisting of a building control system actuator and a building control system sensor;
the field panel operative to receive a user generated field panel event, store data regarding the user generated field panel event, append identification data to the stored data regarding the user generated field panel event, and forward the data regarding the user generated field panel event and appended identification data to the workstation.

15. The system of claim 14, wherein the field panel is further operative to forward notification of receipt by the field panel of the user generated field panel event to the workstation after appending the identification data to the stored data regarding the user generated field panel event.

16. The system of claim 14, wherein the field panel is further operative to temporarily store data regarding the user generated field panel event.

17. The system of claim 16, wherein the data regarding the user generated field panel event is temporarily stored in a buffer.

18. The system of claim 17, wherein the field panel is further operative to erase the buffer after forwarding the data regarding the user generated field panel event and appended identification data to the workstation.

19. A building control system comprising:
a workstation; and
a field panel in communication with the workstation;
the field panel operative to receive a user generated field panel event, store data regarding the user generated field panel event, append identification data to the stored data regarding the user generated field panel event, and forward the data regarding the user generated field panel event and appended identification data to the workstation; and
wherein the field panel is further operable to store the data regarding the user generated field panel event in a buffer, and block subsequent user generated field panel events if the buffer is full.

20. The system of claim 19 wherein the buffer is operable to store data regarding multiple user-generated field panel events.

* * * * *